W. J. HAMBLIN.
PIPE WRENCH.
APPLICATION FILED MAY 12, 1914.
1,104,730.
Patented July 21, 1914.
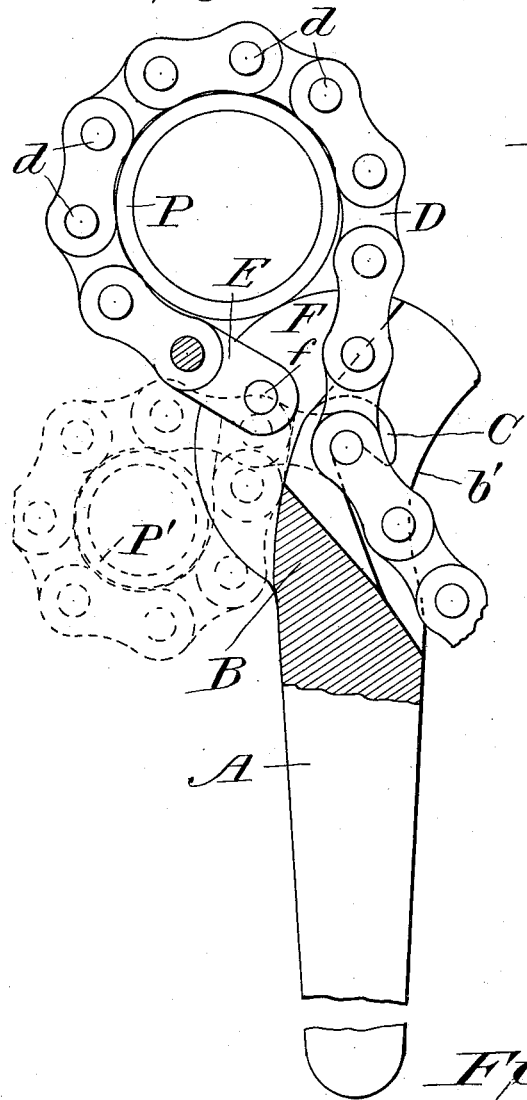
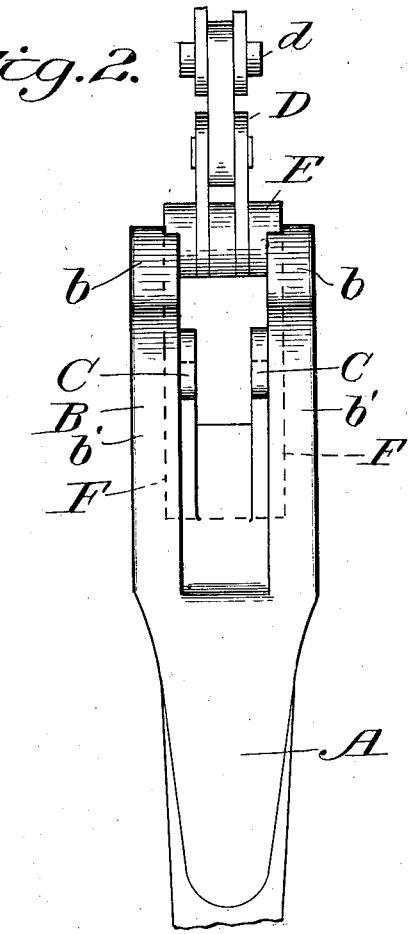
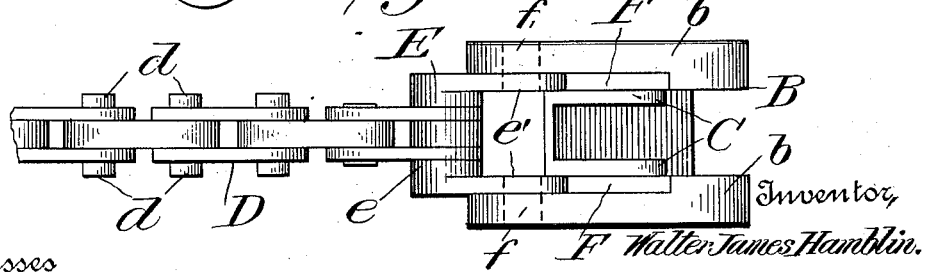
Inventor
F. Walter James Hamblin.
By Geo. A. Hutchinson
Attorney
Witnesses
C. N. Walker.
F. Wm. Ernst

UNITED STATES PATENT OFFICE.

WALTER JAMES HAMBLIN, OF PERTH, WESTERN AUSTRALIA, AUSTRALIA.

PIPE-WRENCH.

1,104,730.  Specification of Letters Patent.  Patented July 21, 1914.

Application filed May 12, 1914. Serial No. 838,151.

*To all whom it may concern:*

Be it known that I, WALTER JAMES HAMBLIN, a subject of King George the Fifth of Great Britain, residing at the city of Perth, in the State of Western Australia, Australia, have invented certain new and useful Improvements in Pipe-Wrenches, of which the following is a full, clear, and exact specification.

This invention relates to pipe wrenches, and has for its object to provide a tool of this kind which has an instantaneous grip, great freedom of release, will not jam or mark the pipe, and may be instantly reversed without taking off the chain or readjusting it. Because of its instantaneous release and grip, this wrench is especially useful in confined and awkward places. The fact that it does not jam or mark the pipe recommends it for use on all exposed pipe fittings.

Further objects will appear as the description proceeds.

The invention will be first hereinafter described in connection with the accompanying drawings, which constitute a part of this specification, and then more specifically defined in the claims at the end of the description.

In the accompanying drawings, wherein the various reference characters represent the same parts in each of the views:—Figure 1 is a broken side elevation of the tool, as constructed in accordance with the present invention. Fig. 2 is a front elevation of the bifurcated head of the wrench, and Fig. 3 is an end view of said head.

The handle A of the wrench has an enlarged head B substantially circular in form and bifurcated at its outer portion, forming similar but reversed lateral members $b$, $b$. The inner faces of said lateral members have integral inwardly projecting hooks or catches C, C, the same shape and size and arranged at the center of the head, that is, concentrically of the circular outer surface or periphery of the head. Said hooks open toward the front and in a downwardly inclined direction, see Fig. 1, and the front portion of the head or lateral members thereof is cut away, as at $b'$, $b'$, to permit ready adjustment of the free end portion of the chain D in said hooks. Said chain D is connected to a special form of link E which is pivoted eccentrically of the head between the lateral members at the rear thereof. The link E comprises a cross piece $e$ to which the chain is pivotally attached, and parallel arms $e'$ pivoted in arcuate recesses F in the inner faces of the lateral members of the head, as at $f$. The inner faces of the arms of the link are preferably flush with the inner faces of the lateral members of the head, as best shown in Fig. 3. At any rate, said arms of the link are spread far enough apart to permit the chain to pass between them when a pipe is gripped on the extreme rear portion of the head as illustrated in dotted lines in Fig. 1. It will be understood, of course, that this special form of link does not interfere at all with a pipe being gripped on the outer portion of the periphery of the head as shown in solid lines in Fig. 1. The pipe illustrated in solid lines is designated P and the pipe in dotted lines P'. The chain D is of a width to pass freely between the hooks C, and is provided with lateral projections $d$ at suitable intervals to engage in said hooks for adjustably securing the chain about a pipe. The arcuate recesses F preferably extend from the junction of the handle with the head to the center of the outer portion of said head, in order to give a wide range of movement to the special link E to which the chain is attached, and thus provide a maximum number of clamping points around the periphery of the head.

The arrangement of the hooks or catches in the center of the head greatly reduces the strain upon the chain in the operation of the tool on a pipe. When engaged with the hooks, the chain will swing about the head without changing its position relative to the periphery of said head, thereby relieving the lateral projections on the chain, which engage said hooks, from the strain to which they would be subjected if said hooks were arranged eccentrically of the head.

Having thus described my invention, what I claim as new and desire to secure by Letters Patent of the United States is:—

1. A pipe wrench having a rounded head with a catch arranged concentrically of its periphery, and a chain eccentrically pivoted at one end to the head and provided with means of adjustable connection with said catch.

2. A pipe wrench having a rounded head with a peripheral slot, catches arranged in said slot concentrically of the periphery of the head, and a chain eccentrically pivoted at one end in said slot and provided with means of adjustable connection with said catches.

3. A pipe wrench having a bifurcated head with a rounded periphery, catches projecting from the inner faces of the bifurcation and arranged centrally of the head and concentrically of the periphery of said head, and a chain eccentrically pivoted at one end in said bifurcation and provided with means of adjustable connection with said catches.

4. A pipe wrench having a bifurcated head with a rounded periphery, catches projecting from the inner faces of the bifurcation and arranged concentrically of the periphery of the head, the walls of said bifurcation having arcuate recesses, a link pivoted in said recesses with the inner faces of its arms spaced apart a distance equal to the distance between the walls of the bifurcation, for the purpose specified, and a chain pivoted at one end to said link and provided with means of adjustable connection with said catches.

5. A pipe wrench having a bifurcated head with a rounded periphery, catches arranged on the walls of the bifurcation concentrically of the periphery of the head, said walls of the bifurcation having arcuate recesses, a chain provided with means of adjustable connection with said catches, and a link connected to said chain and pivoted in said recesses with the inner faces of its arms spaced apart a distance exceeding the greatest width of the chain, for the purpose specified.

6. A pipe wrench having a bifurcated head with a rounded periphery, catches arranged on the walls of the bifurcation concentrically of the periphery of the head, said catches opening toward the front and in a downwardly inclined direction, a portion of the front of the head being cut away to permit access to said catches, and a chain pivoted at one end in the bifurcation and provided with means of adjustable connection with said catches.

7. A pipe wrench having a bifurcated head with a rounded periphery, catches arranged on the walls of said bifurcation concentrically of the periphery of the head, the walls of said bifurcation having arcuate recesses extending from the junction of the head with the handle to the middle portion of the outer surface of the periphery of the head, a link pivoted in said recesses, and a chain pivotally connected at one end to said link and having means of adjustable connection with the catches.

8. A pipe wrench having at one end of its handle an enlarged rounded head having a peripheral slot in its edge terminated at its ends by rigid walls, a link pivoted in the slot and limited in its movement by the walls, a chain attached to the link, and catches arranged concentrically of the rounded periphery of the head for engaging the chain as set forth.

9. A pipe wrench having at one end of its handle an enlarged rounded head provided with a recess in its periphery and a rigid hooked portion in said recess, a link pivoted eccentrically to the head, and a chain attached to the free end portion of said link and provided with means of adjustable connection with said hooked portion to lock said chain about a pipe when the tool is operated in either direction, the chain adapted to lie in the recess in the head when connected to said hooked portion.

In testimony whereof I have signed my name to this specification in the presence of two attesting witnesses.

WALTER JAMES HAMBLIN.

Witnesses:
 J. A. WITTMAN,
 F. C. HOGARTY.